(12) United States Patent
Yoo et al.

(10) Patent No.: US 9,507,478 B2
(45) Date of Patent: Nov. 29, 2016

(54) THREE-DIMENSIONAL (3D) DISPLAY DEVICE FOR PROVIDING INPUT-OUTPUT INTERFACE USING DYNAMIC MAGNETIC FIELD CONTROL AND METHOD THEREOF

(71) Applicant: SAMSUNG ELECTRONICS CO., LTD., Suwon (KR)

(72) Inventors: Byung In Yoo, Seoul (KR); Yong Beom Lee, Seoul (KR); Gyeong Ja Jang, Seoul (KR); Young Chul Cho, Yongin (KR); Hyo Sun Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 14/019,297

(22) Filed: Sep. 5, 2013

(65) Prior Publication Data

US 2014/0240277 A1    Aug. 28, 2014

(30) Foreign Application Priority Data

Feb. 25, 2013   (KR) .................. 10-2013-0019784

(51) Int. Cl.
*G06F 3/046*    (2006.01)
*G06F 3/01*     (2006.01)

(52) U.S. Cl.
CPC ............... *G06F 3/046* (2013.01); *G06F 3/014* (2013.01); *G06F 3/016* (2013.01)

(58) Field of Classification Search
None
See application file for complete search history.

(56) References Cited

U.S. PATENT DOCUMENTS

| 5,742,331 A * | 4/1998 | Uomori et al. ................. 348/51 |
| 2009/0189871 A1* | 7/2009 | Yoon et al. .................... 345/173 |
| 2012/0105058 A1* | 5/2012 | Kopelevitch ........ G01R 33/093 324/252 |
| 2012/0293411 A1* | 11/2012 | Leithinger .............. G06F 3/017 345/158 |

FOREIGN PATENT DOCUMENTS

| JP | 7-146659 | 6/1995 |
| JP | 2005-227349 | 8/2005 |
| KR | 10-2009-0082714 | 7/2009 |
| KR | 10-2010-0073639 | 7/2010 |
| KR | 10-2011-0080980 | 7/2011 |
| KR | 10-2011-0088969 | 8/2011 |
| KR | 10-1091206 B1 | 12/2011 |

* cited by examiner

*Primary Examiner* — Kenneth B Lee, Jr.
(74) *Attorney, Agent, or Firm* — NSIP Law (57) ABSTRACT

A three-dimensional (3D) display device for providing an input-output interface using a dynamic magnetic field control is disclosed, the device including a display unit to display a 3D image, a magnetic field generation unit to generate a magnetic field, and a control unit to dynamically control the magnetic field generation unit to generate a 3D magnetic field associated with the 3D image.

18 Claims, 6 Drawing Sheets

THREE-DIMENSIONAL (3D) DISPLAY DEVICE FOR PROVIDING INPUT-OUTPUT INTERFACE USING DYNAMIC MAGNETIC FIELD CONTROL AND METHOD THEREOF

CROSS-REFERENCE TO RELATED APPLICATIONS

This application claims the priority benefit of Korean Patent Application No. 10-2013-0019784, filed on Feb. 25, 2013, in the Korean Intellectual Property Office, the disclosure of which is incorporated herein by reference.

BACKGROUND

1. Field

One or more embodiments relate to a three-dimensional (3D) display device for providing an input-output interface using a dynamic magnetic field control and method thereof.

2. Description of the Related Art

In recent times, developments in display technology for generating a three-dimensional (3D) image have witnessed a great deal of progress. Accordingly, there is a need for a development in interface technology for interacting with the 3D image.

SUMMARY

The foregoing and/or other aspects are achieved by providing a three-dimensional (3D) display device for providing an input-output interface, the 3D display device including a display unit to display a 3D image, a magnetic field generation unit to generate a magnetic field, and a control unit to dynamically control the magnetic generation unit to generate a 3D magnetic field associated with the 3D image.

The control unit may include a magnetic field generation control unit to control the magnetic field generation unit, such that a 3D magnetic field corresponding to the 3D image is generated based on location information of pixels included in the 3D image, and a magnetic change recognition unit to recognize a change of the 3D magnetic field in response to an input from a user.

The control unit may include a magnetic field change recognition unit to recognize the change of the 3D magnetic field due to a magnetic input object, and an input object recognition unit to recognize the input object, based on the change of the 3D magnetic field.

The control unit may include an input object control unit to dynamically control the magnetic field generation unit, such that a motion of a magnetic input object is controlled by the 3D magnetic field.

The control unit may dynamically control the magnetic field generation unit, such that an electric device is charged wirelessly by the 3D magnetic field.

The foregoing and/or other aspects are achieved by providing a method for operating a three-dimensional (3D) display device, the method including displaying a 3D image, using a 3D image display, generating a 3D magnetic field associated with the 3D image, using an electromagnet array, and recognizing a change of the 3D magnetic field in response to an input from a user.

The foregoing and/or other aspects are achieved by providing a display device including a display unit to display a three-dimensional (3D) image and a magnetic field generation unit to generate a magnetic field that corresponds with the 3D image displayed by the display unit.

The foregoing and/or other aspects are achieved by providing an apparatus for controlling a three-dimensional (3D) display including a magnetic field generation unit to generate a magnetic field and a control unit to control the magnetic field generation unit to generate a 3D magnetic field associated with a 3D image displayed by the display device.

The foregoing and/or other aspects are achieved by providing a display apparatus including a display unit to display a three-dimensional (3D) image, a magnetic field generation unit to generate a magnetic field, a magnetic field change recognition unit to recognize a change in the generated magnetic field, and a magnetic field generation control unit to control the magnetic field generation unit to further change the 3D magnetic field based on the recognized change in the generated magnetic field.

The foregoing and/or other aspects are achieved by providing a display apparatus including a display unit to display a three-dimensional (3D) image, a magnetic field generation unit to generate a magnetic field, a magnetic field change recognition unit to detect a change in the generated magnetic field, and a 3D image deformation unit to change the displayed 3D image based on the change in the generated magnetic field detected by the magnetic field change recognition unit.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
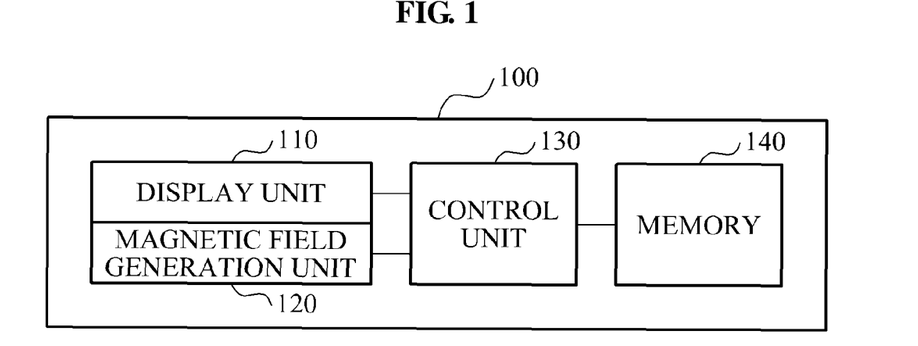
FIG. 1 illustrates a three-dimensional (3D) display device for providing an input-output interface according to example embodiments.

FIG. 1 illustrates a three-dimensional (3D) display device 100 for providing an input-output interface according to example embodiments.

Referring to FIG. 1, the 3D display device 100 may include, for example, a display unit 110, a magnetic field generation unit 120, a control unit 130, and a memory 140.

Here, the 3D display device 100 may refer to a device for providing a 3D image to a user, and providing an interface for interacting with the user, and may include any kind of large display device such as a television (TV) or monitor, or a mobile display device, for example, a smart phone, and the like.

The display unit 110 may refer to a device for displaying a 3D image. The display unit 110 may be implemented in various ways. For example, the display unit 110 may be implemented using a stereoscopy or the display unit 110 may be implemented using a hologram. However, the aforementioned schemes are exemplary and a configuration of the display unit 110 is not limited thereto.

The magnetic field generation unit 120 may refer to a device for generating a magnetic field. More particularly, the magnetic field generation unit 120 may generate a magnetic field in a space in which a 3D image is displayed by the display unit 110.

Here, the 3D display device 100 may provide a user with a substantial interface for operating or interfacing with the 3D image, using the magnetic field generation unit 120. Here, the magnetic field generation unit 120 may be implemented using an electromagnet array. An individual electromagnet included in the electromagnet array may be configured by a solenoid forming a magnetic field when power is provided. Detailed descriptions pertaining to the magnetic field generation unit 120 will be discussed later.

The control unit 130 may dynamically control the magnetic field generation unit 120 to generate a magnetic field associated with a 3D image. As used herein, a magnetic field associated with a 3D image generated by the magnetic field generation unit 120 under a dynamic control of the control unit 130 may refer to a 3D magnetic field.

The control unit 130 may control the display unit 110 to display a 3D image using 3D image data stored in the memory 140. Further, the control unit 130 may control the magnetic field generation unit 120 to generate a 3D magnetic field associated with a corresponding 3D image using the 3D image data stored in the memory 140.

The memory 140 may store the 3D image data in advance, and may provide corresponding data to the control unit 130 as necessary, subsequent to the 3D image data received by a communication unit being temporarily or consistently stored (not shown).

The 3D image display device 100 may generate a 3D image along with a 3D magnetic field associated with a corresponding 3D image, and provide technology for enhancing a sense of operating a 3D virtual object.

For example, when a user operates a 3D virtual object, the 3D image display device 100 may provide a sense of physical resistance or a sense of touch similar to what would be provided during the operation of an actual object. In other words, in an embodiment, when the user interacts with or operates the 3D virtual object, the 3D image display device seeks to emulate the experience a user would have interacting with or operating an actual or real object such as an actual object that is similar to the virtual object.

Figure 2:
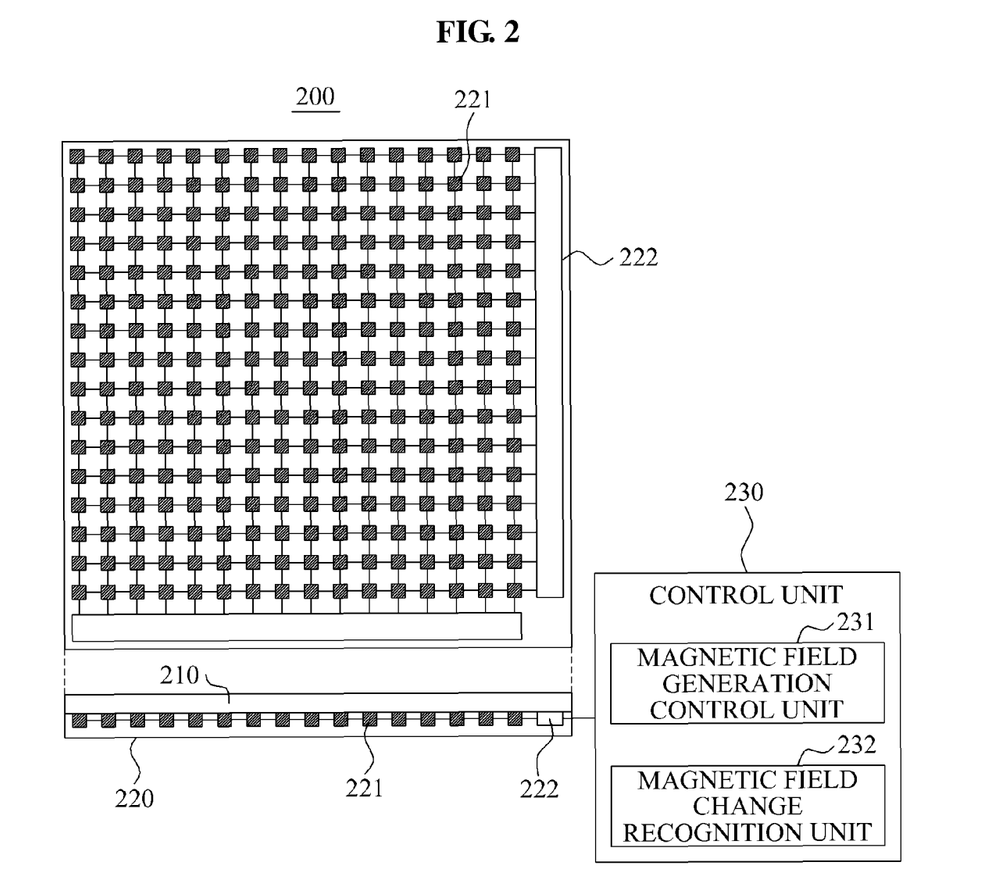
FIG. 2 illustrates a 3D display device using an electromagnet array according to example embodiments.

FIG. 2 illustrates a 3D display device 200 using an electromagnet array according to example embodiments.

Referring to FIG. 2, the 3D display device 200 may include, for example, a display unit 210, a magnetic field generation unit 220, and a control unit 230.

The control unit 230 may include a magnetic field generation control unit 231 and a magnetic change recognition unit 232.

The magnetic field generation control unit 231 may control the magnetic field generation unit 220 to generate a 3D magnetic field corresponding to a 3D image such as a 3D image displayed by the display unit 210.

For example, the magnetic field generation control unit 231 may control the magnetic field generation unit 220 to generate a 3D magnetic field, based on location information of pixels included in a corresponding 3D image. Here, the location information of the pixels included in the 3D image may include a 3D coordinate of corresponding pixels. The 3D coordinate of the pixels may refer to a relative coordinate, based on the display unit 210, as necessary.

According to the example embodiments, 3D image data may include a 3D map including 3D information of a 3D image, irrespective of video contents or graphic contents of the 3D image. The magnetic field generation control unit 231 may control the magnetic field generation unit 220 to generate a 3D magnetic field, based on the 3D map.

The magnetic field generation control unit 231 may control the magnetic field generation unit 220, such that a shape of a 3D magnetic field corresponds to a shape of a 3D image, as necessary. Detailed descriptions pertaining to an operation of the magnetic field generation control unit 231 will be discussed with reference to FIG. 3.

A user may input information that influences a 3D magnetic field generated by the magnetic field generation unit 220. For example, the user may perform inputting using a magnetic input object that changes the 3D magnetic field.

When the user operates a 3D virtual object using a magnetic input object in a space in which the 3D magnetic field is generated, the user may feel a sense of a physical resistance or a sense of touch. In an embodiment, the user may perceive a sensation similar to that which would be provided during operation of an actual object, such as an actual object that is similar to the virtual object.

When the user operates the 3D virtual object, the 3D display device 200 may provide a sense of physical resistance or a sense of touch. In an embodiment, the 3D display device 200 may provide the user with a sensation similar to that which would be provided during operation of the actual object, such as an actual object that is similar to the virtual object.

Additionally, the magnetic field change recognition unit 232 may recognize a change of a 3D magnetic field in response to an input from a user. The magnetic field change recognition unit 232 may be implemented in a variety of manners.

For example, when the 3D magnetic field changes due to an input from a user, the magnetic field change recognition unit 232 may recognize a change of a 3D magnetic field using the magnetic field generation unit 220. Alternatively, the magnetic field change recognition unit 232 may recognize the change of the 3D magnetic field, using a magnetic field sensor (not shown) that is optionally provided.

Although not shown, the control unit 230 may further include a 3D image deformation unit and a display control unit.

The 3D image deformation unit may change or deform a 3D image displayed by the display unit 210, based on the change of the magnetic field recognized by the magnetic field change recognition unit 232. The display control unit may control the display unit 210 to display the 3D image deformed by the 3D image deformation unit.

For example, the 3D image deformation unit may compare a magnetic field generated by the magnetic field generation unit 220 and a 3D magnetic field changed by a magnetic input object, such as a permanent magnet. The 3D image deformation unit may obtain a 3D magnetic field difference map, based on a result of the comparison. Further, the 3D image deformation unit may deform a 3D map or a 3D image included in 3D image data using the 3D magnetic field difference map. As another non-limiting example, when a user pokes a 3D image of a teddy bear, a change of the magnetic field may be recognized by the magnetic field change recognition unit 232, and based on the recognized change, the magnetic field generation unit 220 may alter the magnetic field corresponding to the teddy bear such that the user may feel the sensation of resistance while pressing the surface of the teddy bear. Moreover, the 3D image deformation unit may control the display unit 210 to display the surface of the teddy bear as being deformed at the location where the user pokes the teddy bear.

As still another non-limiting example, a user may make a chopping motion through the midsection of a 3D image of a grapefruit. A change of the magnetic field may be recognized by the magnetic field change recognition unit 232 as a result of the motion, and based on the recognized change, the magnetic field generation unit 220 may alter the magnetic field corresponding to the grapefruit such that the user may feel the sensation of resistance while cutting through the grapefruit. Moreover, the 3D image deformation unit may control the display unit 210 to display the grapefruit as being cut into two pieces at the location of the midsection where the user chops the grapefruit.

The magnetic field generation unit 220 may be configured by an electromagnet array 221. The electromagnet array 221 may include a plurality of electromagnets disposed in a matrix structure. The magnetic field generation unit 220 may include an electromagnet node controller 222 to control a current flowing through the electromagnet array 221 through interoperating with the control unit 230.

An electromagnet may generate a magnetic field when a current is input, and otherwise, when no current is input, the electromagnet may fail to generate a magnetic field. Based on such a property, whether a 3D magnetic field is to be generated may be controlled.

The electromagnet may generate a magnetic field having differing polarities, for example, based on a direction in which a current is input. For example, when a current is controlled to flow from one end to another end, the electromagnet may generate a magnetic field having a north (N) pole. Conversely, when the current is controlled to flow from one end to another, the electromagnet may generate a magnetic field having a south (S) pole.

Moreover, the electromagnet may generate a magnetic field of differing strengths, based on an amount of an input current. For example, the electromagnet may generate a strong magnetic field when the amount of the input current is relatively great when compared to the amount of the input current being relatively small.

Accordingly, the 3D display device 200 may dynamically control a strength or a polarity of the generated 3D magnetic field, through dynamically controlling an amount of a current input to a plurality of electromagnets or a direction of the current.

In this instance, the 3D display device 200 may control the electromagnet array 221 to generate a 3D magnetic field based on a 3D map included in 3D image data.

Although not shown, the magnetic field generation control unit 231 may include a current control unit. The current control unit may transmit a control signal that controls a current input to the electromagnet array 221 for generating a 3D magnetic field to the electromagnet node controller 222.

For example, the current control unit may dynamically control a direction of a current input to the electromagnet array 221 and an amount of a current input to the electromagnet array 221, such that a shape of a 3D magnetic field may correspond to a shape of a 3D image.

As described above, a user may perform inputting that influences the 3D magnetic field generated by the magnetic field generation unit 220. In this instance, although not shown, the magnetic field change recognition unit 232 may recognize a change of the 3D magnetic field, using a current change detection unit.

More particularly, the current change detection unit may detect a change of a current flowing through the electromagnet array 221.

The current change detection unit may determine whether a change is present in the direction of the current and the amount of the current flowing through the actual electromagnet array 221, based on a direction of a current or an amount of a current controlled, by the current change detection unit, to be input to the electromagnet array 221. Further, the current change detection unit may measure a corresponding amount of change.

For example, the current change detection unit may determine whether a current flowing through the electromagnet array 221 differs from a current controlled by the current control unit, using the electromagnet node controller 222. In this instance, the current change detection unit may measure a difference between an amount of the current controlled by the current control unit and an amount of the current flowing through the actual electromagnet array 221.

The magnetic field change recognition unit 232 may recognize a change of the 3D magnetic field, based on a change of the current detected by the current change detection unit. For example, the magnetic field change recognition unit 230 may estimate an amount of change of the 3D magnetic field, using the amount of change of the current measured by the current change detection unit.

Hereinafter, a 3D display device may be assumed to include a magnetic field generation unit using an electromagnet array for ease of convenience. However, it will be understood by those of ordinary skill in the art that the configuration of the 3D display device is not limited to the aforementioned assumption.

Figure 3:
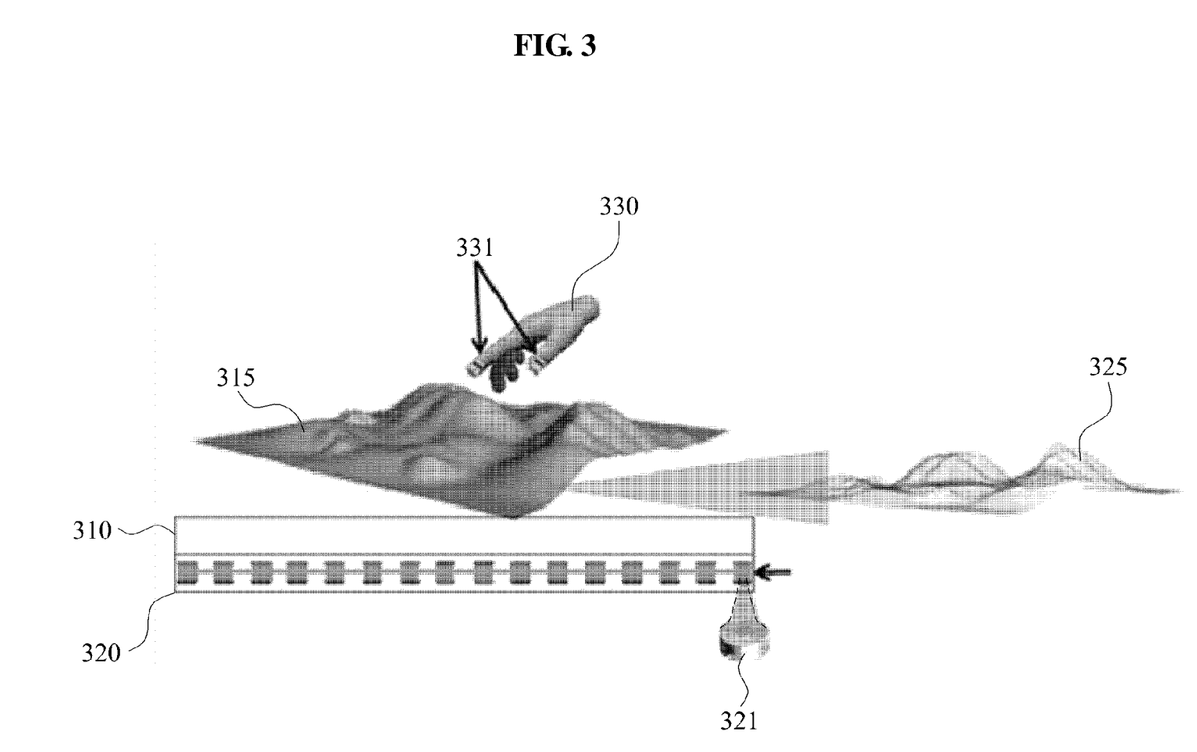
FIG. 3 illustrates a method for dynamically controlling a 3D magnetic field for operating a 3D image according to example embodiments.

FIG. 3 illustrates a method for dynamically controlling a 3D magnetic field for operating a 3D image according to example embodiments.

Referring to FIG. 3, a display unit 310 may output a 3D image 315, such as a 3D terrain map, a 3D object, and the like. The magnetic field generation unit 320 may generate a 3D magnetic field 325 that has a shape similar to a shape of the 3D image output by the display unit 310.

For example, the magnetic field generation unit 320 may generate the 3D magnetic field 325 using an individual electromagnet 321 included in a magnetic field array. Here, the shape of the 3D magnetic field 325 may be determined by each of a direction of a current and a strength of a current flowing through the individual electromagnet 321.

Here, a user may touch the 3D image 315 using a magnetic input object 331. The user may perform inputting that operates the 3D image 315 while the input object 331 is worn on a hand 330, for example.

For example, the user may touch the 3D image 315 while wearing a ring, a thimble, or gloves on a body part such as a hand, and the like, to which a permanent magnet is attached. In this instance, the user may feel a sense of actually interfacing with the 3D image 315 through an interaction between a 3D magnetic field formed by the magnetic field generation unit 320 and a magnetic field of a permanent magnet attached to the body part of the user. In other words, the user's interaction with the 3D image 315 may be perceived as realistic or life-like.

Here, a user may perform inputting in order to deform a shape of the 3D image 315, such as through chopping, gripping, or poking the 3D image 315 firmly.

The permanent magnet of the magnetic field attached to the body part of the user may influence a magnetic field of an electromagnet array. As a result, an amount of a current flowing through the individual electromagnet 321 included in the electromagnet array may be changed.

The 3D display device according to the example embodiments may recognize the change in the amount of the current, obtain a 3D magnetic field difference map based on the change in the amount of the current recognized, and using the 3D magnetic field difference map, deform a 3D map included in 3D image data or a 3D image. Descriptions previously provided in FIG. 2 may be applied to the operations relating to FIG. 3 and thus, a repeated description will be omitted for conciseness.

The 3D display device according to example embodiments may recognize an input object based on a change of a 3D magnetic field by the magnetic input object 331.

More particularly, the 3D display device may recognize at least one of a position, a motion, an appearance, and a type of the input object, based on the change of the 3D magnetic field.

For example, a user may perform inputting that influences a 3D magnetic field, using an input object to which a permanent magnet is attached. In this instance, a 3D magnetic field may change due to the magnetic field of the permanent magnet, and further, an output current of individual electromagnets included in an electromagnet array may change.

The 3D display device may recognize whether the output current changes and an amount of change of an output current. Additionally, the 3D display device may detect a 3D position and a size of the permanent magnet attached to the input object based on the recognized amount of change of the output current.

The 3D display device according to the example embodiments may recognize an input object, based on the aforementioned change of the 3D magnetic field in a space in which a 3D image is displayed by the display unit. Accordingly, the 3D display device may provide technology for recognizing an input object seamlessly from a display surface to a predetermined distance.

The 3D display device according to the example embodiments may face fewer spatial and temporal limitations when compared to a scheme for recognizing an object using a light such as an infrared ray sensor, and the like. For example, the 3D display device may provide object recognition technology having an enhanced recognition rate outdoors or in the afternoon when ambient light levels are high.

A permanent magnet attached to a predetermined input object may be provided in any predetermined shape, such as, a star, a triangle, a square, and the like. In this instance, a pattern that influences an electromagnet array may vary based on the shape of the permanent magnet.

Accordingly, the 3D display device may distinguish a type of an input object to which a permanent magnet is attached by recognizing a pattern of a change of an output current of a plurality of electromagnets included in the electromagnet array.

Figure 4:
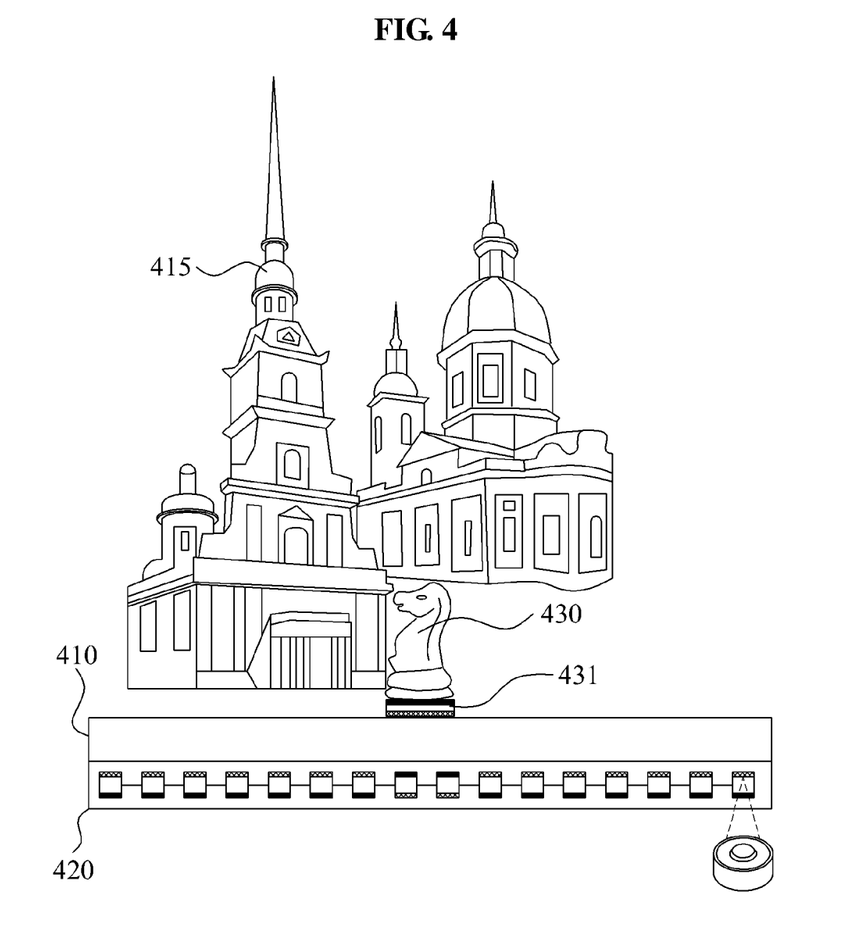
FIG. 4 illustrates a method for dynamically controlling a 3D magnetic field for controlling a motion of an input object according to example embodiments.

FIG. 4 illustrates a method for dynamically controlling a 3D magnetic field for controlling a motion of an input object according to example embodiments.

Referring to FIG. 4, a 3D display device may control a motion of a magnetic input object, by dynamically controlling a 3D magnetic field generated by a magnetic field generation unit 420.

For example, a magnetic chess piece 430 may be disposed on a display unit 410. Here, a permanent magnet 431 may be attached to a bottom surface of the chess piece 430 to provide for a magnetism of the chess piece 430.

In this instance, the 3D display device may control a motion of the chess piece 430, such as moving the chess piece 430, as an actual object, and the like, by dynamically forming a 3D magnetic field generated by an electromagnet array included in the magnetic field generation unit 420.

Further, the 3D display device may provide an interface that provides for interoperation between an actual object and a virtual object, through displaying an input image 415 including the virtual object, using the display unit 410. For example, as illustrated in FIG. 4, chess piece 430 may be included within an input image 415 that includes virtual buildings or other relevant background for the chess piece 430. When a user interacts with the virtual object of the input image, such as by pointing to one of the virtual buildings, the interaction may be measured by measuring a change of the magnetic field using the magnetic field change recognition unit 232. As a result of the measured change in the magnetic field, the magnetic field generation control unit 220 may further alter the magnetic field so that the chess piece 430 is moved in a predetermined manner.

Figure 5:
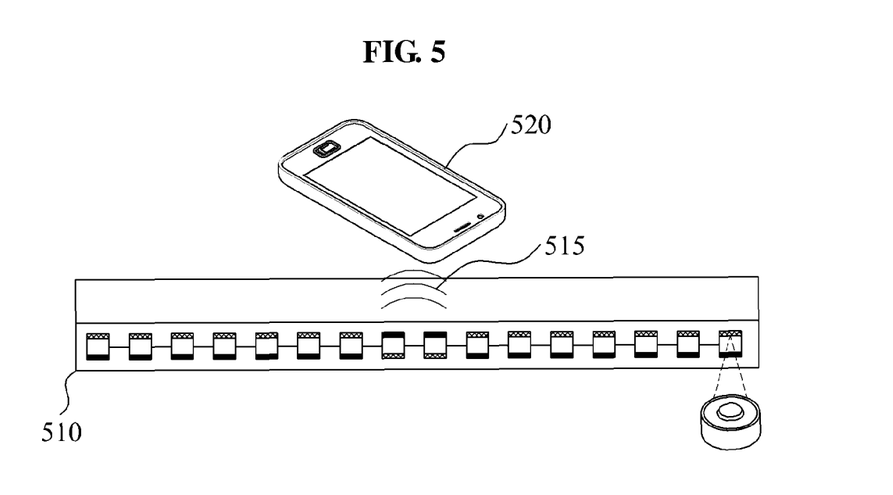
FIG. 5 illustrates a method for dynamically controlling a 3D magnetic field for wirelessly charging an electric device according to example embodiments.

FIG. 5 illustrates a method for dynamically controlling a 3D magnetic field for wireless charging of an electric device according to example embodiments.

Referring to FIG. 5, a 3D display device may charge an electric device 520 wirelessly by dynamically controlling a 3D magnetic field 515 generated by a magnetic field generation unit 510.

For example, a mobile device, such as a smart phone, may be disposed on a display to be charged wirelessly.

In this instance, the magnetic field generation unit 510 may generate an induced current for wireless charging. More particularly, the magnetic field generation unit 510 may be configured as an electromagnet array including a plurality of electromagnets, and a solenoid for forming a magnetic field in the plurality of electromagnets may function as an induced current generation coil for a magnetic induction.

Alternatively, a solenoid for forming a magnetic field in a plurality of electromagnets may function as a transmission coil for a magnetic resonance.

Figure 6:
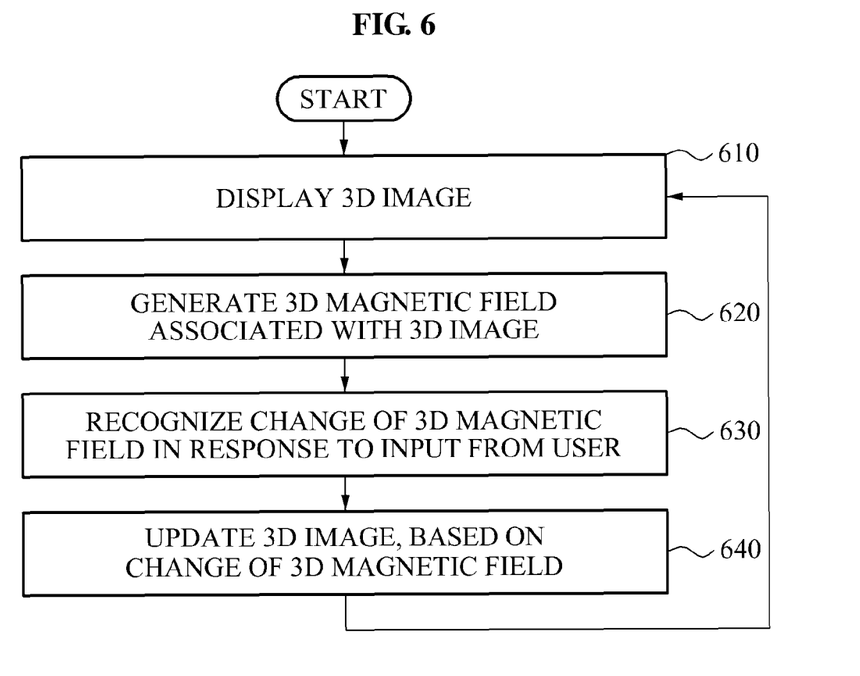
FIG. 6 illustrates a method for operating a 3D display device for providing an input-output interface according to example embodiments.

FIG. 6 illustrates a method for operating a 3D display device for providing an input-output interface according to example embodiments.

Referring to FIG. 6, in operation 610, a 3D display device may display a 3D image using a 3D image display. In operation 620, the 3D display device may generate a 3D magnetic field associated with the 3D image using an electromagnet array. The 3D display device may recognize a change of the 3D magnetic field in response to an input from a user.

In operation 640, the 3D display device may update a 3D image, based on a change of a magnetic field. In this instance, the 3D display device may display the updated 3D image by returning to operation 610.

Descriptions previously provided in FIGS. 1 through 5 may be applied to the operations relating to FIG. 6 and thus, a repeated description will be omitted for conciseness.

A portable device as used throughout the present specification includes mobile communication devices, such as a personal digital cellular (PDC) phone, a personal communication service (PCS) phone, a personal handy-phone system (PHS) phone, a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), an automotive navigation system (for example, a global positioning system), and the like. Also, the portable device as used throughout the present specification includes a digital camera, a plasma display panel, and the like.

The method for operating the 3D display device for providing the input-output interface according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the three-dimensional (3D) display device described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A three-dimensional (3D) display device providing an input-output interface, the 3D display device comprising:
   a display unit configured to display a 3D image;
   a magnetic field generation unit configured to generate a magnetic field; and
   a control unit configured to dynamically control the magnetic field generation unit to generate a 3D magnetic field corresponding to the 3D image,
   wherein the magnetic field generation unit comprises an electromagnet array,
   the magnetic field generation unit comprises a current control unit configured to control a current input to the electromagnet array in order to generate the 3D magnetic field, and
   wherein the current control unit is configured to control a direction of the current and an amount of the current, to control a shape of the 3D magnetic field to correspond to a shape of the 3D image.

2. The 3D display device of claim 1, wherein the control unit comprises:

a magnetic field generation control unit configured to control the magnetic field generation unit to generate the 3D magnetic field corresponding to the 3D image based on location information of pixels included in the 3D image; and
a magnetic field change recognition unit configured to recognize a change of the 3D magnetic field in response to an input from a user.

3. The 3D display device of claim 2,
the magnetic field change recognition unit comprises a current change detection unit configured to detect a change of a current flowing through the electromagnet array in order to recognize a change of the 3D magnetic field.

4. The 3D display device of claim 2, wherein the control unit further comprises:
a 3D image deformation unit configured to deform the 3D image, based on the change of the magnetic field recognized by the magnetic field change recognition unit; and
a display control unit configured to control the display unit to display the 3D image deformed by the 3D image deformation unit.

5. The 3D display device of claim 1, wherein the control unit comprises:
a magnetic field change recognition unit configured to recognize a change of the 3D magnetic field caused by a magnetic input object; and
an input object recognition unit configured to recognize the input object, based on the change of the 3D magnetic field.

6. The 3D display device of claim 5,
the magnetic field change recognition unit is configured to detect a change in a current flowing through a plurality of electromagnets included in the electromagnet array, and
the input object recognition unit is configured to recognize at least one of a position, an appearance, and a type of the input object, based on the change of the current.

7. The 3D display device of claim 1, wherein the control unit comprises:
an input object control unit configured to dynamically control the magnetic field generation unit to move a magnetic object.

8. The 3D image display device of claim 1, wherein the control unit is configured to dynamically control the magnetic field generation unit to wirelessly charge an electric device using the 3D magnetic field.

9. A method for operating a three-dimensional (3D) display device, the method comprising:
displaying a 3D image, using a 3D image display;
generating a 3D magnetic field corresponding to the 3D image, using an electromagnet array; and
recognizing a change of the 3D magnetic field in response to an input from a user,
wherein the generating of the 3D magnetic field comprises:
controlling a current input to the electromagnet array in order to generate the 3D magnetic field;
controlling a direction of the current and an amount of the current; and
controlling a shape of the 3D magnetic field to correspond to a shape of the 3D image.

10. The method of claim 9, wherein the generating of the 3D magnetic field comprises:

generating a 3D magnetic field map corresponding to the 3D image, based on location information of pixels included in the 3D image; and controlling the current input to the electromagnet array, based on the 3D magnetic field map.

11. The method of claim 9, wherein the recognizing of the change of the 3D magnetic field comprises:

measuring a change of a current flowing through the electromagnet array.

12. The method of claim 9, further comprising:

updating the 3D image, based on the change of the 3D magnetic field; and displaying the updated 3D image, using the 3D image display.

13. The method of claim 9, further comprising:

recognizing an input object used by the user for inputting, based on the change of the 3D magnetic field.

14. A non-transitory computer-readable medium comprising a program for instructing a computer to perform the method of claim 9.

15. A display device comprising:

a display unit configured to display a three-dimensional (3D) image; and a magnetic field generation unit configured to generate a magnetic field that corresponds with the 3D image displayed by the display unit, wherein the magnetic field generation unit comprises an electromagnet array, the magnetic field generation unit comprises a current control unit configured to control a current input to the electromagnet array in order to generate the magnetic field, and wherein the current control unit is configured to control a direction of the current and an amount of the current, to control a shape of the magnetic field to correspond to a shape of the 3D image.

16. The display device of claim 15, further comprising a magnetic field generation control unit configured to control the magnetic field generation unit to generate the magnetic field based on a pixel location of the displayed 3D image.

17. The display device of claim 16, wherein the magnetic field generation control unit is further configured to control the magnetic field generation unit to generate the magnetic field such that the shape of the magnetic field corresponds to the shape of the displayed 3D image.

18. The display device of claim 15, further comprising:

a magnetic field change recognition unit configured to detect a change in the generated magnetic field; and a 3D image deformation unit configured to change the displayed 3D image based on the change in the generated magnetic field detected by the magnetic field change recognition unit.

* * * * *